Sept. 5, 1939.  R. TRAVNITSCHEK  2,171,675
PAINT BOX
Filed Feb. 28, 1938
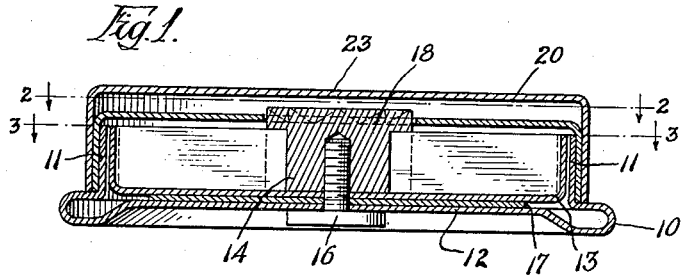
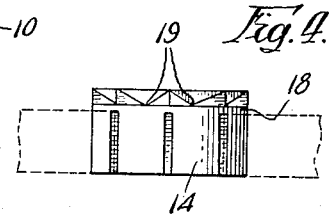
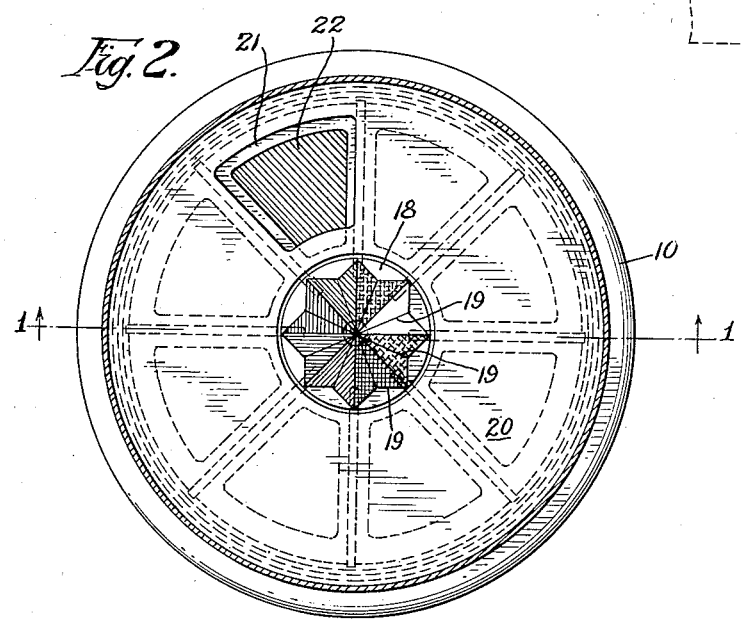
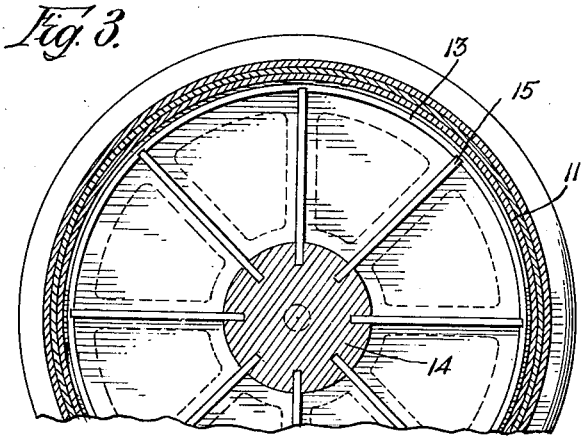
Inventor:
Rudolph Travnitschek,
By: Tefft & Tefft
Attorneys.

Patented Sept. 5, 1939

2,171,675

UNITED STATES PATENT OFFICE 2,171,675

PAINT BOX

Rudolf Travnitschek, Schlesien, Czechoslovakia

Application February 28, 1938, Serial No. 193,033
In Czechoslovakia September 1, 1933

3 Claims. (Cl. 41—4)

This invention has reference to receptacles and dispensing devices for artist's colors or the like and has for its principal object the provision of a device adapted to contain a plurality of color materials such as is used by artists, the colors being retained in separate compartments, the same having a cover member adapted to protect the colors and means for indicating the color contained in each compartment obscured by the cover.

Another object is to provide a container as aforesaid having a series of compartments arranged upon a revoluble member, a cover for the revoluble member and means outside the cover for indicating colors contained in the compartments obscured by the cover.

Other objects will appear in the following description and accompanying drawing in which:

Fig. 1 is a sectional elevational view of my device taken on line 1—1 in Fig. 2;

Fig. 2 is a sectional plan view of the device taken on line 2—2 in Fig. 1;

Fig. 3 is a fragmental sectional plan view taken on line 3—3 in Fig. 1, and

Fig. 4 is a fragmental elevational view showing details to be referred to.

Figs. 1 and 2 disclose my device as comprising a base member 10 of any suitable plan form, having a circular upstanding rim portion 11 and a depressed bottom portion 12.

Within the rim 11 is disposed a circular pan member 13, in the central portion of which is secured a hub member 14.

Between the hub and rim of the pan there is disposed a plurality of radially disposed partitions 15 which are of substantially the same height as the wall of the pan and are secured to the hub, bottom of the pan and peripheral walls thereof in such a manner as to form a series of compartments as shown best in Fig. 3.

The pan 13 is supported to rotate in the base 10 by means of a screw 16 which is concentrically disposed in the bottom of the base and retained in an opening therein. The screw is securely screwed into the hub and is made rotatable in the base and in this manner the pan 13 is rotatably supported therein, the head of the screw serving to retain the elements of the assembly in proper relation.

A washer 17 is disposed between the base and pan to serve as a separator whereby friction between the pan and base is rendered and the pan is more easily rotated as will be described.

The top surface of hub 14 is preferably formed to have a series of depressions 19 of any desired form. The depressions are equal in number to the compartments of pan 13 and are arranged in register therewith as shown.

A cover member 20 is disposed so as to cover the pan 13, it having a downwardly directed circular wall proportioned so as to slip over the wall 11 of the base as shown.

The cover is provided with a central opening of such dimension as to clear the upper portion 18 of the hub 14 and an additional opening 21 disposed and fashioned so as to be registerable with a compartment of pan 13 as best shown in Fig. 2.

In practical use, the colors to be used may be in the form of cakes such as are in common use by artists, and the cakes may have a form such as that outlined at 22 in Fig. 2. The form referred to is preferred although colors of any other form or consistency may be used.

The colors may be arranged in the compartments in any order desired and when the arrangement is decided upon the indentations 19 are each painted with a color corresponding to that in the adjacent compartment.

Since the cover 20 is stationary and has only one opening 21, all of the compartments of the pan, except the one lying below the opening, are invisible. However, the depressions 19, carrying the index colors are visible and thus any desired color may be located and quickly brought into position in register with opening 21 by simple rotary manipulation of the hub.

An outside cover 23, adapted to cover the entire assembly when the device is not in use, is usually provided, although the device may be considered complete without it.

Numerous modifications of the structure of my invention are obviously possible without alteration of the principle thereof. I do not wish to be limited except within the scope of the appended claims.

What I claim is:

1. A device of the class described comprising a base member, a member revoluble thereon having a series of compartments, a cover member obscuring all but one of said compartments and an index visible outside the cover to indicate the contents of the obscured compartments.

2. A device of the class described comprising a base member, a member revoluble thereon having a series of compartments, a cover member obscuring all but one of said compartments, color materials in said compartments, said revoluble member having a portion visible outside said cover, said portion having means for indicating the colors contained in the obscured compartments whereby an operator may quickly locate the compartment containing the desired color.

3. A device of the class described comprising a base member, a member revoluble thereon having a series of compartments containing color materials, a cover member having an opening adapted to expose one of said compartments, said revoluble member being movable under said cover to bring any one of the compartments into register with said opening to expose the color material therein, said revoluble member having a portion visible outside the cover, said portion having means for indicating the contents of the compartments obscured by the cover and means for manipulating the revoluble member to position any desired compartment opposite said opening.

RUDOLF TRAVNITSCHEK.